(12) United States Patent
Kwan

(10) Patent No.: US 7,731,354 B1
(45) Date of Patent: Jun. 8, 2010

(54) SPECTACLE FRAME

(75) Inventor: Po Kwong Kwan, Hong Kong (HK)

(73) Assignee: Faith Idea Limited, Hong Kong (CN)

( * ) Notice: Subject to any disclaimer, the term of this patent is extended or adjusted under 35 U.S.C. 154(b) by 0 days.

(21) Appl. No.: 12/437,666

(22) Filed: May 8, 2009

(51) Int. Cl.
*G02C 5/08* (2006.01)

(52) U.S. Cl. .......................................... 351/63; 351/137

(58) Field of Classification Search ................... 351/63, 351/78–82, 124, 128, 133, 136–139
See application file for complete search history.

(56) References Cited

U.S. PATENT DOCUMENTS 6,158,860 A * 12/2000 Huang ......................... 351/136
2009/0051868 A1* 2/2009 Kwan .......................... 351/137

\* cited by examiner

*Primary Examiner*—Huy K Mai
(74) *Attorney, Agent, or Firm*—William J. Sapone; Coleman Sudol Sapone P.C.

(57) ABSTRACT

A spectacle frame is disclosed as including two frame members which are pivotally movable relative to each other, each frame member being capable of holding a piece of optical lens, each frame member having an outer side and an opposite inner side, and two nose pads each with a free major surface, in which each frame member includes an extension with a tunnel, and each nose pad is engaged with a pin and a stopper for simultaneous movement, and the pins are received within the tunnel of the respective frame member for relative rotational movement to thereby rotate each nose pad relative to the respective frame member, and each stopper is adapted, during rotational movement of the nose pad relative to the respective frame member, to abut the respective frame member to limit the extent of rotational movement of the nose pad relative to the respective frame member.

14 Claims, 6 Drawing Sheets

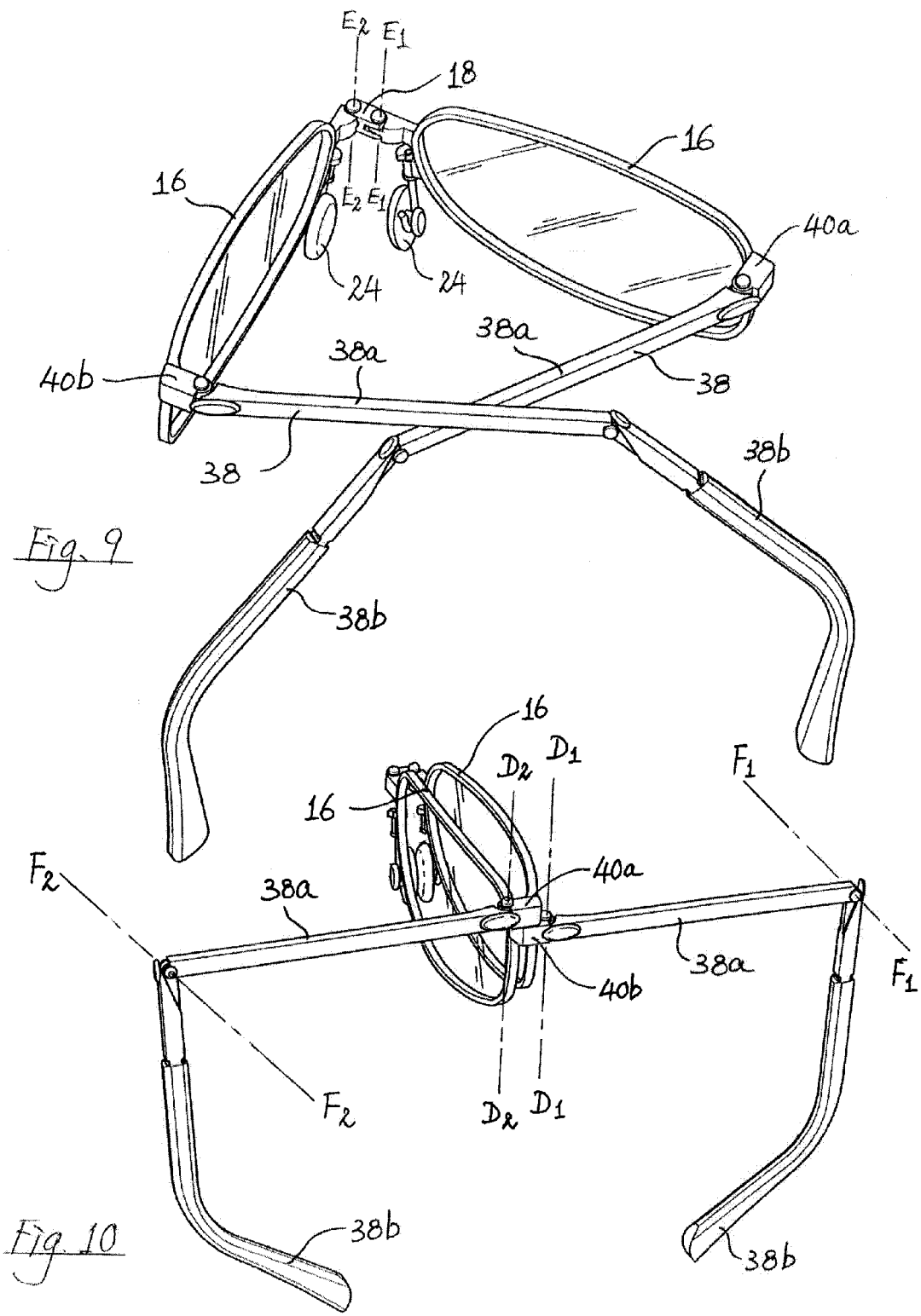

SPECTACLE FRAME

This invention relates to a spectacle frame, in particular such a frame to which a pair of optical lenses are engageable to form a pair of eyeglasses.

BACKGROUND OF THE INVENTION

Spectacle frames of various constructions have been available to which lenses may be releasably held for forming pairs of eyeglasses for wearing. It is found that when a user wears a pair of eyeglasses by placing the pair eyeglasses onto his/her nose, it is usually necessary to adjust the position of the nose pads (and thus of the pair of eyeglasses) to achieve comfort in wearing. In most cases only very minor adjustments to the position of the nose pads need be made. In some cases, however, it may be necessary to forcibly bend the links joining the nose pads and the spectacle frame to suit individual needs. This may damage or even break the links and, thus, the spectacles.

In addition, with the advance of age, the lenses in the eyes of a person may become less elastic, resulting in presbyopia. While a normal lens of an eye will thicken for reading books or focusing on near objects, a person of middle age or above may have to wear a pair of eyeglasses with convex lenses or bifocals for this purpose. However, as such a pair of eyeglasses are usually only required when reading, and are often seen as a sign of old age, the wearer will usually carry them in handbags or the like, and put them on only when necessary. There therefore exists a requirement that such a pair of eyeglasses be foldable as compact as possible. However, existing spectacle frames are not of a structure which allows the spectacle frames to be folded compactly.

It is thus an object of the present invention to provide a spectacle frame and a pair of eyeglasses in which the aforesaid shortcomings are mitigated, or at least to provide a useful alternative to the trade and public.

SUMMARY OF THE INVENTION

According to a first aspect of the present invention, there is provided a spectacle frame including a first and a second frame members which are pivotally movable relative to each other, each said frame member being adapted to hold a piece of optical lens, and each said frame member having an outer side and an opposite inner side, and at least a first nose pad with a free major surface, wherein said first frame member includes a first extension with a first tunnel, wherein said first nose pad is engaged with a first pin member and a first stopper for simultaneous movement, wherein said first pin member is received within said first tunnel of said first frame member for relative rotational movement to thereby rotate said first nose pad relative to said first frame member, and wherein said first stopper is adapted, during said rotational movement of said first nose pad relative to said first frame member, to abut said first frame member to limit the extent of rotational movement of said first nose pad relative to said first frame member.

According to a second aspect of the present invention, there is provided a pair of eyeglasses including a spectacle frame including a first and a second frame members which are pivotally movable relative to each other, each said frame member holding a piece of optical lens, and each said frame member having an outer side and an opposite inner side, and at least a first nose pad with a free major surface, wherein said first frame member includes a first extension with a first tunnel, wherein said first nose pad is engaged with a first pin member and a first stopper for simultaneous movement, wherein said first pin member is received within said first tunnel of said first frame member for relative rotational movement to thereby rotate said first nose pad relative to said first frame member, and wherein said first stopper is adapted, during said rotational movement of said first nose pad relative to said first frame member, to abut said first frame member to limit the extent of rotational movement of said first nose pad relative to said first frame member.

BRIEF DESCRIPTION OF THE DRAWINGS

A preferred embodiment of the present invention will now be described, by way of example only, with reference to the accompanying drawings, in which:

FIGS. 9 to 11 are perspective views showing the way of folding the spectacle frame of FIG. 1.

DETAILED DESCRIPTION OF THE PREFERRED EMBODIMENT

Figure 1:
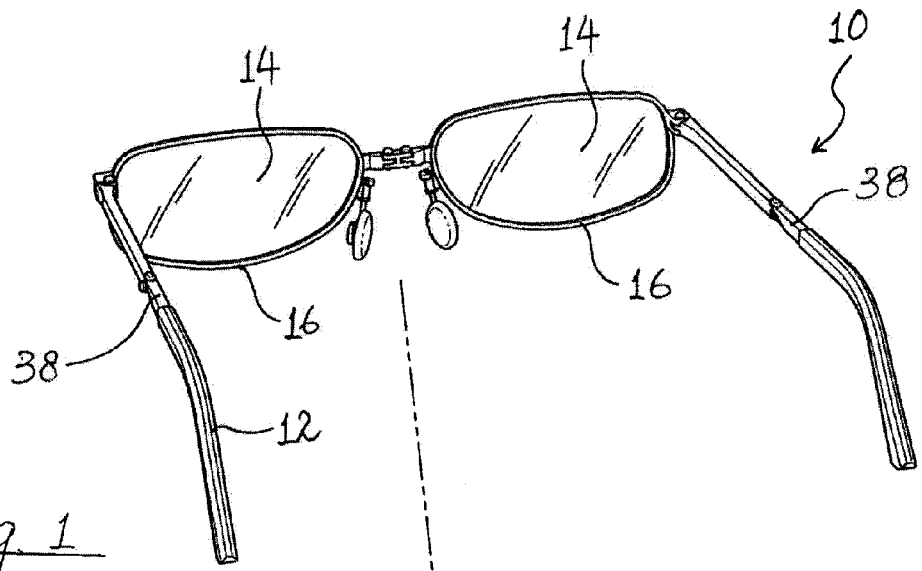
FIG. 1 is perspective view showing a spectacle frame according to a preferred embodiment of the present invention.

A pair of eyeglasses including a spectacle frame according to a preferred embodiment of the present invention are shown in FIG. 1, and generally designated as 10. The pair of eyeglasses 10 include a spectacle frame 12 to which two pieces of optical lenses 14, which may be convex lenses, bifocals, or concave lenses, are releasably held.

The spectacle frame 12 has two frame members 16 which are pivotally connected with each other via an intermediate bridge 18. The spectacle frame 12 is shown in FIG. 1 in its fully-open configuration in which the two frame members 16 are generally parallel to and coplanar with each other.

Figure 2:
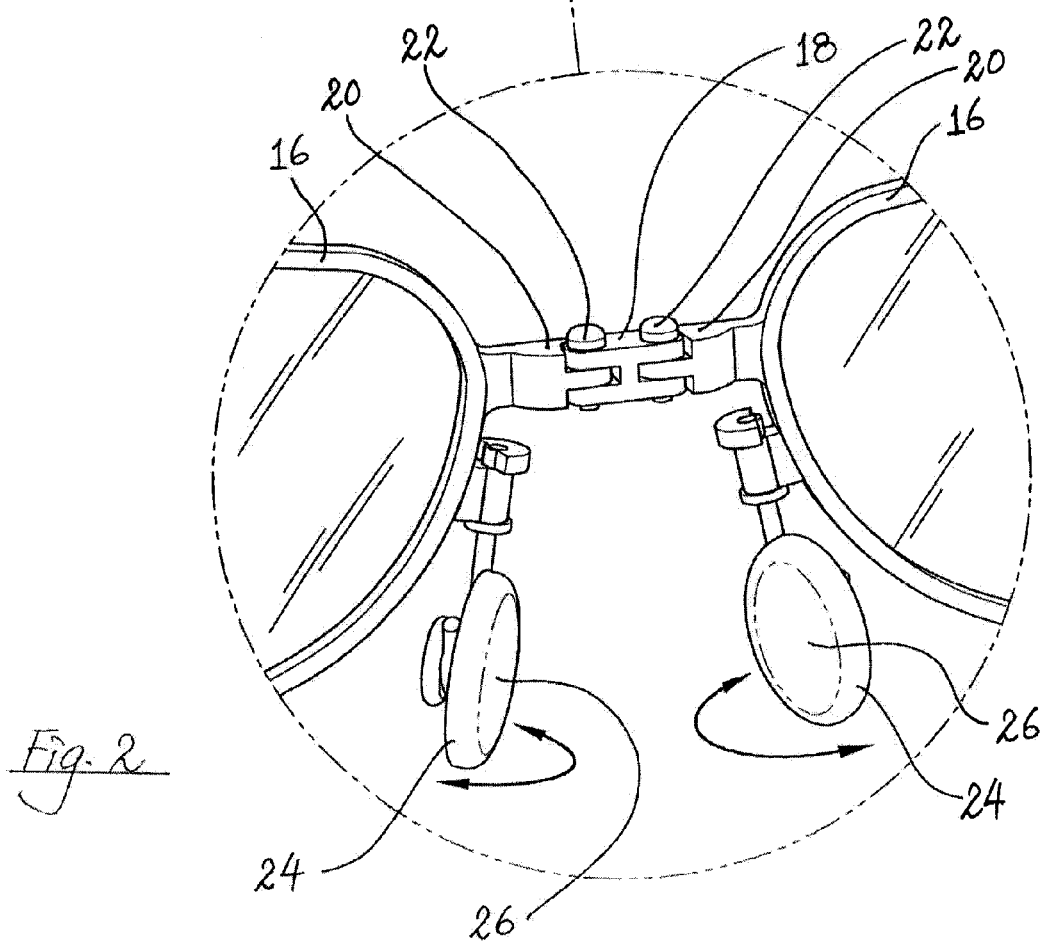
FIG. 2 is an enlarged view of part of the spectacle frame in FIG. 1, showing the connection between the frame members and that between the frame members and the nose pads.

As shown more clearly in FIG. 2, each frame member 16 has a finger 20 which is pivotally engaged with the bridge 18 via a respective rivet 22. The frame members 16 are thus pivotally movable relative to each other and relative to the bridge 18. To each of the frame member 16 is engaged a nose pad 24 with a free outer major surface 26 which is adapted, in use, to contact the nose of a wearer. The manner in which the nose pads 24 are engaged with the respective frame member 16 will be discussed below.

Returning to FIG. 1, it can also be seen that each frame member 12 is pivotally engaged with an arm 38, so that the arms 38 are pivotally movable relative to the rest of the spectacle frame 12 and eyeglasses 10. The structure of the arms 38 will be discussed below.

Figure 3:
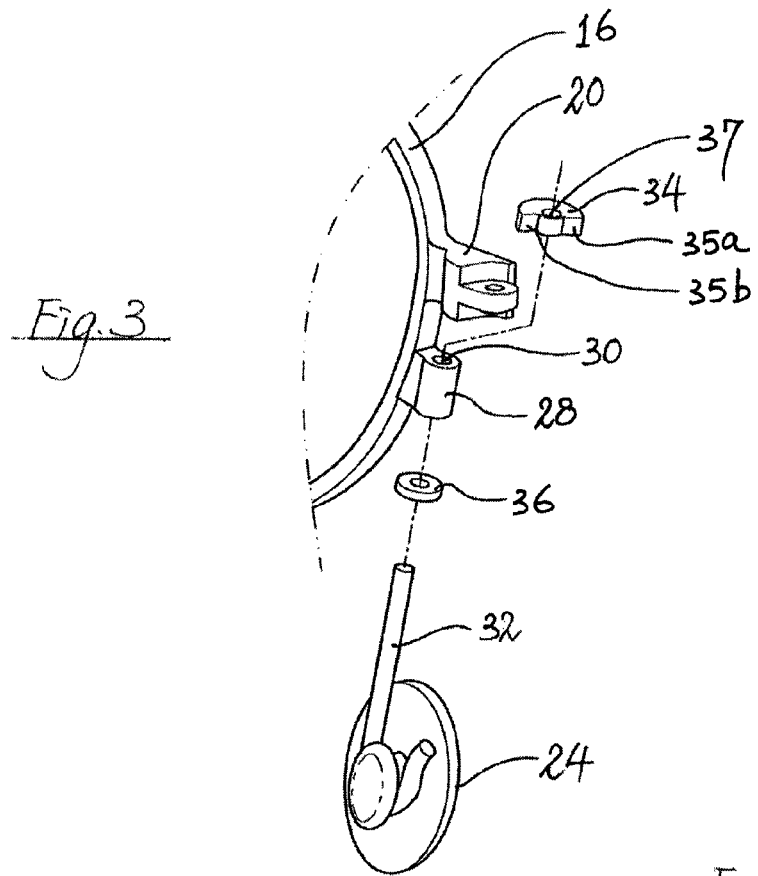
FIG. 3 is an exploded view showing the engagement between one of the nose pads and the respective frame member of the spectacle frame of FIG. 1.

As shown in FIG. 3, each frame member 16 is fixedly engaged with an extension 28 with a longitudinal tunnel 30. The nose pad 24 is engaged with a pin 32 which is bent at its lower end to form a hook for frictional or snap-fit engagement with the nose pad 24. The upper end of the pin 32 is received through the tunnel 30, and is fixedly engaged with a stopper 34 sitting on the upper end of the tunnel 30. The stopper 34 is of a generally semi-circular cross-section with two planar side surfaces 35a, 35b. The upper longitudinal end of the pin 32 is received within a channel 37 of the stopper 34 in such a way that the stopper 34 is fixedly engaged with the pin 32. A washer 36 is provided at a lower end of the tunnel 30 and is fixedly engaged with the pin 32. Thus, each set of pin 32, washer 30, stopper 34, and nose pad 24 are engaged with one another for simultaneous movement.

Figure 5:
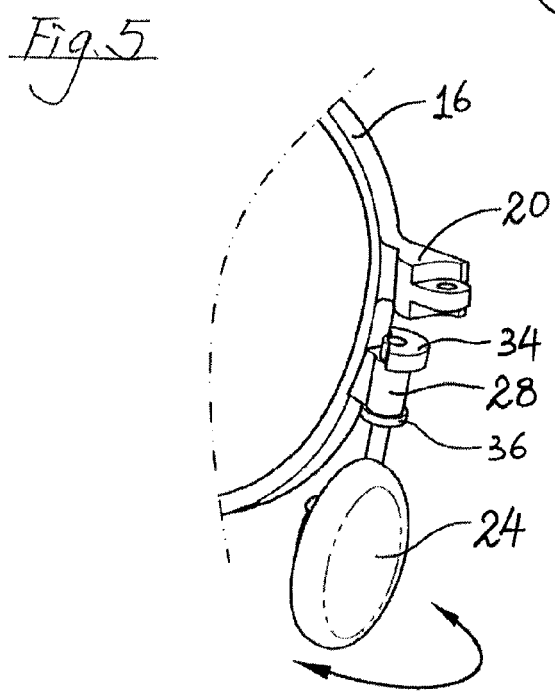
FIG. 5 is a perspective view showing the nose pad in FIG. 3 in a second position relative to the frame member.
Figure 4:
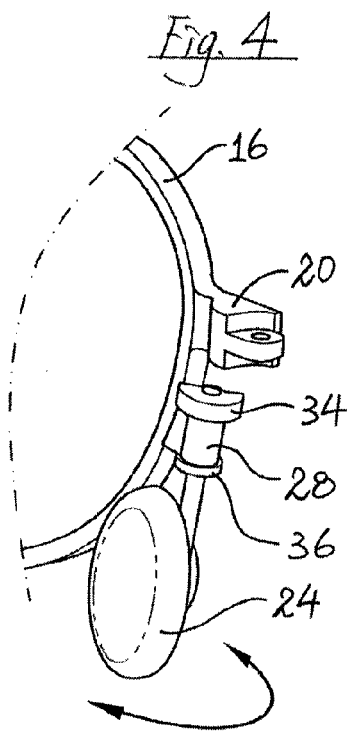
FIG. 4 is a perspective view showing the nose pad in FIG. 3 in a first position relative to the frame member.

By way of such an arrangement, the pin 32 can rotate within the tunnel 30 and relative to the extension 28 (and thus the respective frame member 16) about the longitudinal axis of the un-bent portion of the pin 32 (as shown in FIGS. 4 and 5), but the pin 32 cannot exhibit any movement relative to the extension 28 (and thus the respective frame member 16) along the longitudinal axis of the un-bent portion of the pin 32.

Figure 6:
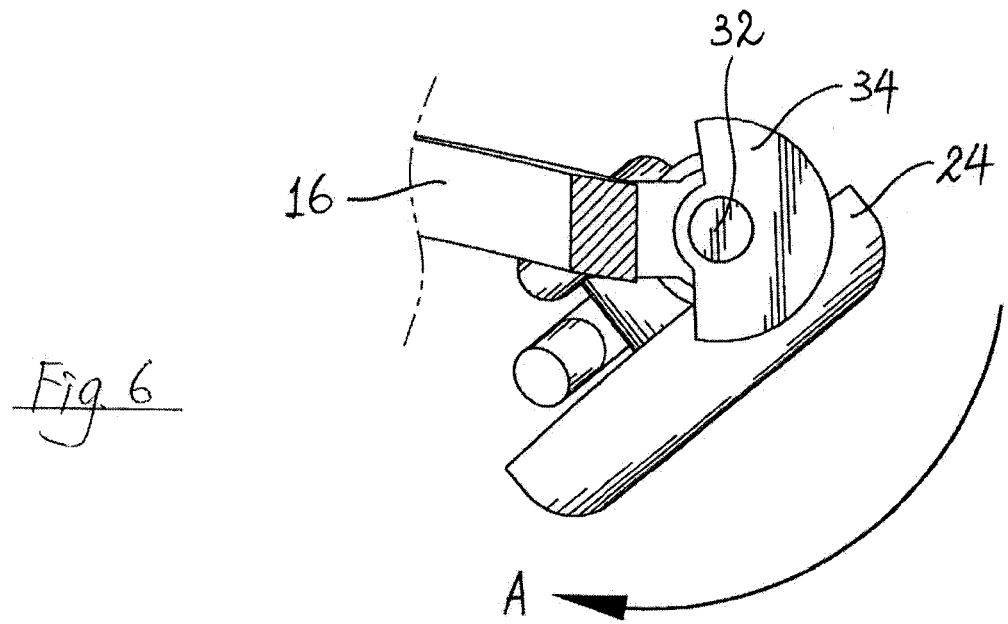
FIG. 6 is a top view showing the nose pad in FIG. 3 in a third position relative to the frame member.
Figure 7:
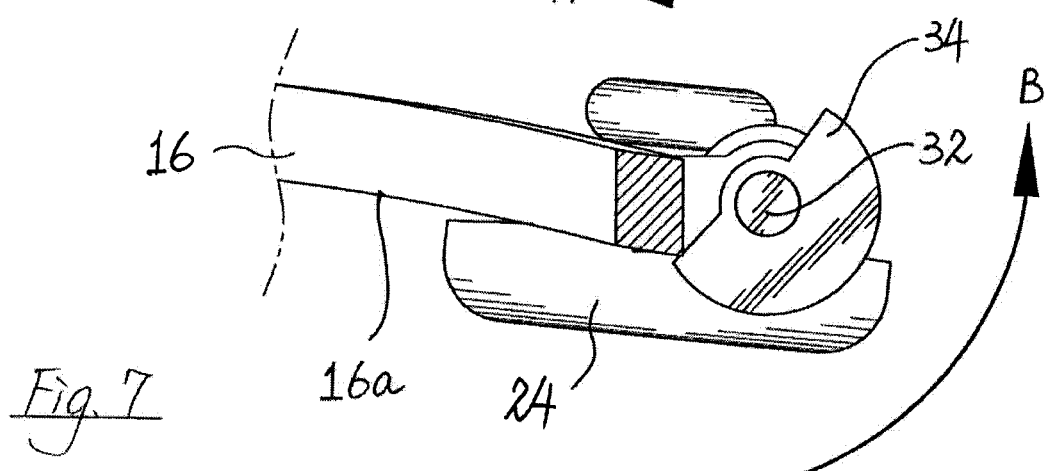
FIG. 7 is a top view showing the nose pad in FIG. 3 in the first position relative to the frame member as shown in FIG. 4.
Figure 8:
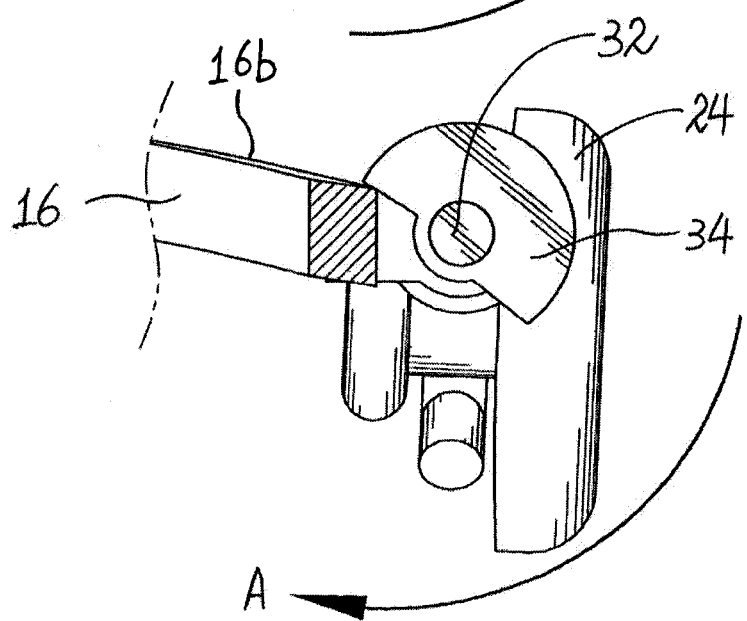
FIG. 8 is a top view showing the nose pad in FIG. 3 in the second position relative to the frame member as shown in FIG. 5.

As shown more clearly in FIGS. 6 to 8, when assembled, the nose pad 24 may be rotated freely relative to the frame member 16 with which it is engaged, among the three positions shown in FIGS. 6 and 8, to suit the shape of the nose of the wearer. In particular, the nose pad 24 may move from its position shown in FIG. 6 in the direction indicated by the arrow A in FIG. 6 to an extreme position as shown in FIG. 7, in which the planar side surface 35a of the stopper 34 abuts an edge of an inner side 16a of the frame member 16 to limit the extent of rotational movement of the nose pad 24 relative to the frame member 16 in the direction indicated by the arrow A. The nose pad 24 may then be moved from the extreme position shown in FIG. 7 in the direction indicated by the arrow B in FIG. 7 (which is opposite to the direction indicated by the arrow A), through the position as shown in FIG. 6, to another extreme position as shown in FIG. 8, in which the planar side surface 35b of the stopper 34 abuts an edge of an outer side 16b of the frame member 16 (which is opposite to the inner side 16a of the frame member 16) to limit the extent of rotational movement of the nose pad 24 relative to the frame member 16 in the direction indicated by the arrow B. It is of course clear that the nose pad 24 may be moved from the extreme position as shown in FIG. 8, in the direction indicated by the arrow A in FIG. 8, through the position as shown in FIG. 6, to the other extreme position as shown in FIG. 7.

Figure 11:
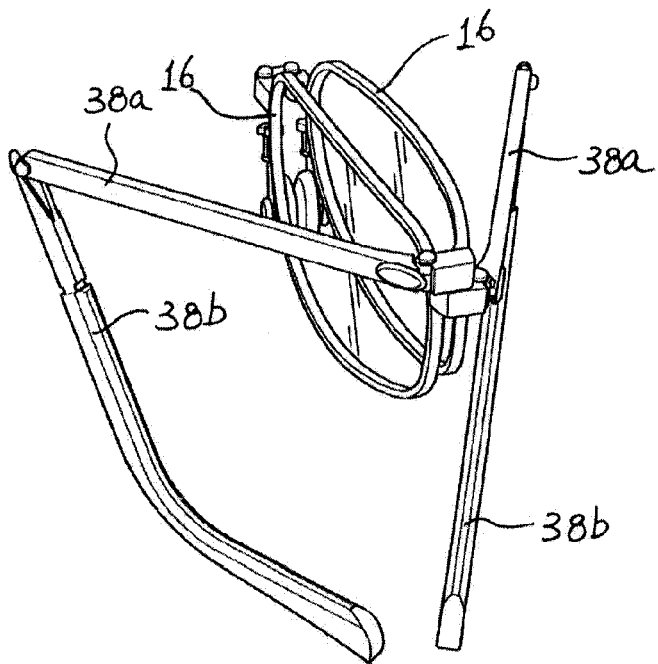
Figure 12:
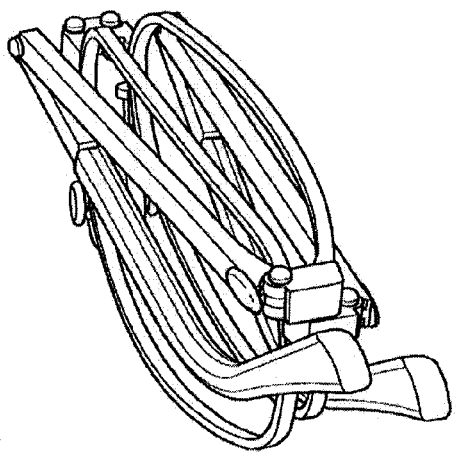
FIGS. 12 to 15 are various views of the spectacle frame of FIG. 1 in the fully-folded configuration.
Figure 13:
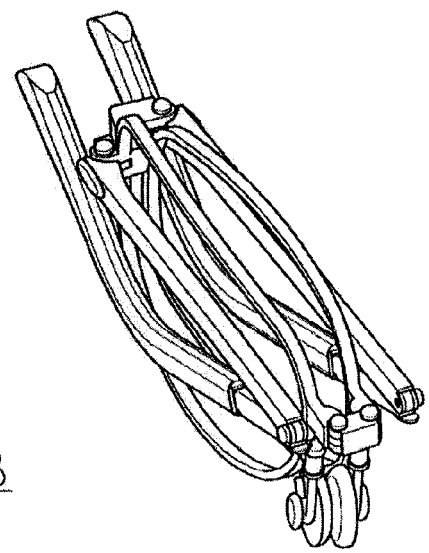

As shown in FIGS. 9 to 11, the spectacle frame 12 may be folded to a compact configuration. As mentioned above, each frame member 16 is pivotally engaged with an arm 38. Each arm 38 includes an inner arm 38a and an outer arm 38b which are pivotally engaged with each other.

More particularly, it can be seen that the frame members 16 are pivotally movable relative to each other and relative to the intermediate bridge 18 about an axis $E_1$-$E_1$ or $E_2$-$E_2$ (as the case may be). The axes $E_1$-$E_1$ and $E_2$-$E_2$ are parallel to each other. Each of the arms 38 is pivotally movable relative to the frame member 16 to which it is engaged about an axis $D_1$-$D_1$ or $D_2$-$D_2$ (as the case may be). The axes $D_1$-$D_1$ and $D_2$-$D_2$ are parallel to each other and to the axes $E_1$-$E_1$ and $E_2$-$E_2$. Each of the inner arms 38a is pivotally movable relative to the outer arm 38b to which it is engaged about an axis $F_1$-$F_1$ or $F_2$-$F_2$ (as the case may be). The axes $F_1$-$F_1$ and $F_2$-$F_2$ are parallel to each other and perpendicular to the axes $E_1$-$E_1$ and $E_2$-$E_2$.

The connection among the frame members 16 and the bridge 18 provides a certain degree of play which allows, when the spectacle frame 12 is folded, an outward extension 40a of one frame member 16 to sit on another outward extension 40b of the other frame member 16 (as shown in FIG. 10).

Each of the inner arms 38a may be pivoted relative to the frame member 16 with which it is engaged about the axis $D_1$-$D_1$ or $D_2$-$D_2$ (as the case may be) (as shown in FIG. 11). The outer arm 38b of each arm 38 is also pivotally movable relative to the inner arm 38a with which it is engaged about the axis $F_1$-$F_1$ or $F_2$-$F_2$ (as the case may be).

Figure 14:
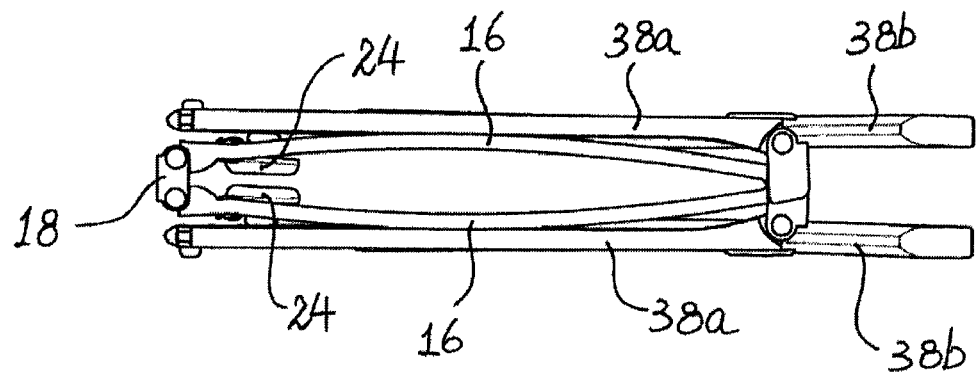
Figure 15:
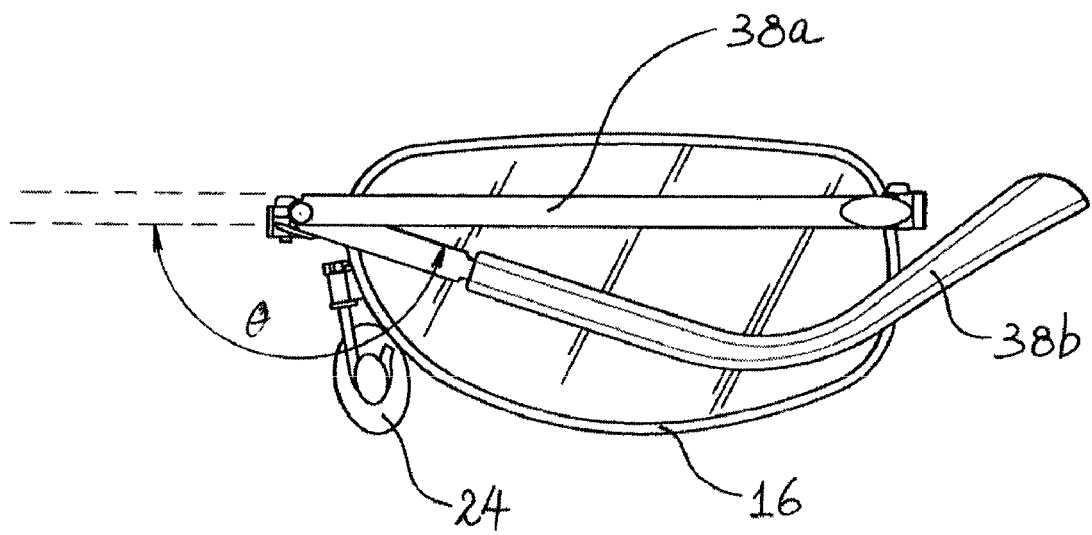

FIGS. 12 to 15 show various views in which the spectacle frame 12 is in its fully-folded configuration. It can be seen that, when the spectacle frame 12 is in this fully-folded configuration:

a. the free major surfaces 26 of the nose pads 24 are generally parallel to each other (as shown in FIG. 14). They may be in contact or out of contact with each other;

b. the frame members 16 are generally parallel to but non-coplanar with each other;

c. both the inner arm 38a and outer arm 38b of each arm 38 are in abutment with the outer side 16b of the frame member 16 with which it is not directly pivotally connected; and d. the outer arm 36b has moved through an angle θ which is an obtuse angle, i.e. between 90° and 180°.

It can be seen that a spectacle frame 12 according to this invention can be folded into a very compact configuration, and the nose pads 24 are allowed to be easily rotated relative to the frame members 16 to suit the shape of the nose of each individual wearer. The pair of eyeglasses 10 are thus convenient to carry and comfortable to wear.

It should be understood that the above only illustrates an example whereby the present invention may be carried out, and that various modifications and/or alterations may be made thereto without departing from the spirit of the invention.

It should also be understood that various features of the invention which are here, for brevity, described in the context of a single embodiment, may be provided separately or in any appropriate sub-combinations.

The invention claimed is:

1. A spectacle frame including:
  a first and a second frame members which are pivotally movable relative to each other, each said frame member being adapted to hold a piece of optical lens, and each said frame member having an outer side and an opposite inner side, and
  at least a first nose pad with a free major surface,
  wherein said first frame member includes a first extension with a first tunnel,
  wherein said first nose pad is engaged with a first pin member and a first stopper for simultaneous movement,
  wherein said first pin member is received within said first tunnel of said first frame member for relative rotational movement to thereby rotate said first nose pad relative to said first frame member, and
  wherein said first stopper is adapted, during said rotational movement of said first nose pad relative to said first frame member, to abut said first frame member to limit the extent of rotational movement of said first nose pad relative to said first frame member.

2. A spectacle frame according to claim 1, further including a second nose pad with a free major surface,
  wherein said second frame member includes a second extension with a second tunnel,
  wherein said second nose pad is engaged with a second pin member and a second stopper for simultaneous movement, wherein said second pin member is received within said second tunnel of said second frame member for relative rotational movement to thereby rotate said second nose pad relative to said second frame member, and wherein said second stopper is adapted, during said rotational movement of said second nose pad relative to said second frame member, to abut said second frame member to limit the extent of rotational movement of said second nose pad relative to said second frame member.

3. A spectacle frame according to claim 2, wherein said first and second frame members are pivotally movable relative to each other between a fully-open configuration in which said frame members are generally coplanar with each other, and a fully-folded configuration in which said frame members are parallel to, but non-coplanar with, each other.

4. A spectacle frame according to claim 3, wherein when said first and second frame members are in said fully-folded configuration, said free major surfaces of said first and second nose pads contact each other or face each other.

5. A spectacle frame according to claim 3, wherein said first frame member is engaged with a first arm which is pivotally movable relative to said first frame member about a first axis, and wherein said second frame member is engaged with a second arm which is pivotally movable relative to said second frame member about a second axis.

6. A spectacle frame according to claim 5, wherein said first arm includes an inner arm member and an outer arm member, wherein said inner arm member of said first arm is pivotally movable relative to said first frame member about said first axis, and wherein said outer arm member of said first arm is pivotally movable relative to said inner arm member of said first arm about a third axis which is substantially perpendicular to said first axis.

7. A spectacle frame according to claim 6, wherein said second arm includes an inner arm member and an outer arm member, wherein said inner arm member of said second arm is pivotally movable relative to said second frame member about said second axis, and wherein said outer arm member of said second arm is pivotally movable relative to said inner arm member of said second arm about a fourth axis which is substantially perpendicular to said second axis.

8. A spectacle frame according to claim 7, wherein said outer arm member of said second arm is pivotally movable relative to said inner arm member of said second arm about said fourth axis by up to over 90°.

9. A spectacle frame according to claim 6, wherein, when said first and second frame members are in said fully-folded configuration, said inner arm member and outer arm member of said first arm are movable to abut said outer side of said second frame member.

10. A spectacle frame according to claim 9, wherein, when said first and second frame members are in said fully-folded configuration, said inner arm member and outer arm member of said second arm are movable to abut said outer side of said first frame member.

11. A spectacle frame according to claim 6, wherein said outer arm member of said first arm is pivotally movable relative to said inner arm member of said first arm about said third axis by up to over 90°.

12. A spectacle frame according to claim 1, wherein said first stopper is adapted to abut said outer side of said first frame member to limit the extent of rotational movement of said first nose pad relative to said first frame member in a first direction, and is adapted to abut said inner side of said first frame member to limit the extent of rotational movement of said first nose pad relative to said first frame member in a second direction which is opposite to said first direction.

13. A spectacle frame according to claim 1, wherein said first stopper is of a generally semi-circular cross-section.

14. A pair of eyeglasses including a spectacle frame according to claim 1, wherein each said frame member holds a piece of optical lens.

* * * * *